United States Patent [19]

Tiedeman

[11] Patent Number: 5,518,466
[45] Date of Patent: May 21, 1996

[54] JAM-TOLERANT ROTARY ACTUATOR

[75] Inventor: Robert K. Tiedeman, Wayne, N.J.

[73] Assignee: Curtiss Wright Flight Systems Inc., Fairfield, N.J.

[21] Appl. No.: 346,375

[22] Filed: Nov. 29, 1994

[51] Int. Cl.$^6$ ............................................. F16H 57/08
[52] U.S. Cl. ..................... 475/342; 475/341; 475/339; 475/340
[58] Field of Search ............................ 475/341, 342 OR, 475/347, 338, 339, 340, 346, 263; 403/359, 2

[56] References Cited

U.S. PATENT DOCUMENTS

| | | |
|---|---|---|
| 4,282,776 | 8/1981 | Eller . |
| 4,721,016 | 1/1988 | Burandt ................ 475/346 X |
| 4,742,730 | 5/1988 | Dorn et al. . |
| 4,751,855 | 6/1988 | Hudson et al. ............ 475/342 X |
| 4,798,268 | 1/1989 | Fargier et al. ............ 403/359 X |
| 4,856,379 | 8/1989 | Jafarey . |
| 4,932,613 | 6/1990 | Tiedeman et al. . |
| 4,932,809 | 6/1990 | Kopp ..................... 403/359 |
| 5,071,397 | 12/1991 | Grimm . |
| 5,120,285 | 6/1992 | Grimm . |

*Primary Examiner*—Charles A. Marmor
*Assistant Examiner*—Peter Kwon
*Attorney, Agent, or Firm*—Klauber & Jackson

[57] ABSTRACT

A jam-tolerant rotary actuator 70 through the incorporation of shear lugs 84,92 formed on an inner input sun gear member 82 and on an inner movable output ring gear member 90 which correspond to recesses 88,96 formed in an outer input sun gear member 86 and in an outer movable output ring gear member 94, respectively, where, upon application of a maximum torque to either the inner input sun gear member 82 or the outer movable output ring gear member 94, the shear lugs 84,92 will shear thereby allowing the inner input sun gear member 82 to be movable independent of the outer input sun gear member 86 or the outer movable output ring gear member 94 to be movable independent of the inner movable output ring gear member 90, respectively.

21 Claims, 5 Drawing Sheets

JAM-TOLERANT ROTARY ACTUATOR

BACKGROUND OF THE INVENTION

1. Field of the Invention

The present invention relates to actuators and, more particularly, to a jam-tolerant rotary actuator for use in aircraft flight control systems and the like.

2. Description of the Prior Art

Actuators are widely used throughout virtually all industries to control the movement of various components. In the aerospace industry, actuators are commonly used to control the movement of wing flaps. One particular type of actuator that has been used to control such wing flap movement is a rotary actuator. One particular type of rotary actuator is the Curtiss-Wright Power Hinge® (substantially disclosed in U.S. Pat. No. 4,932,613), which has an exemplary performance record that is based on numerous applications since its initial use on the B-70 Valkyrie Wingtip Fold.

The Curtiss-Wright Power Hinge® is a rugged, compact, service-proven device combining the functions of both a hinge and an actuator. The Power Hinge features include compound epicyclic high-ratio gearing, paired support rings which replace conventional planetary carriers, self aligning planetary spindle gears, anti-friction hinge ball bearings, corrosion resistant plating, hunting tooth counts to improve life and reduce input torque fluctuations, and balanced tooth geometry to equalize bending stresses. Referring to FIG. 1, a first actuator embodiment 10 utilizing the concepts of the Curtiss-Wright Power Hinge® is shown comprising a one-stage input planetary gearset and a single slice actuator. The basic components of this first actuator embodiment 10 include a splined input drive shaft 12 with an input coupling 14 and an output coupling 16, an annular input bearing 18 with an associated input bearing retainer 20, an annular output bearing 22 with an associated output bearing retainer 24, a plurality of input planetary gears 26 with a corresponding plurality of input planetary gear shafts 28, a splined carrier 30, an input sun gear 32, a plurality of spindle gears 34, two support rings 36, a stiffener 38, a first fixed ring gear 40 with an integrated attachment lug 42, a second fixed ring gear 44 with an integrated attachment lug 46, two annular ball bearings 48, and a movable output ring gear 50 with integrated attachment lugs 52.

The design of the Power Hinge is based upon simplicity which is made possible by symmetrically balancing the tooth forces acting on each spindle gear 34. The outside gear teeth of the spindle gears 34 mesh with the teeth of the fixed ring gears 40,44 and straddle the center movable output ring gear 50. Since the tooth loads on the outside gear teeth of the spindle gears 34 are identical, no overturning moments are created on the spindle gears 34. The support rings 36 provide the only reaction required to achieve force balanced spindles. Hence, the need for a carrier assembly is eliminated.

The unique rolling spindle gear and support ring design reduces weight and package size, and permits installation of a maximum complement of spindle gears 34. Using a full complement of spindle gears 34 results in distributing load over many more gear teeth, thereby reducing the load at each tooth contact and increasing actuator capacity and life.

The two support rings 36 are used to position the spindles gears 34 radially in proper mesh with the fixed ring gears 40,44, and to react the outer mesh separating forces. The support rings 36 are positioned on either side of the center gear teeth of the spindle gears 34. Since the support rings 36 offer no circumferential restraint to the spindle gears 34, they are free to orient themselves under load to achieve optimum load sharing. The support ring outer diameter size is selected to control the fitting of the spindle gears 34 into tight mesh with the fixed ring gears 40,44, thereby controlling preload and backlash of the actuator 10.

The Power Hinge can react torque, shear, and axial thrust loads. The hinge shear and thrust loads are isolated from the hinge moment (torque) by the annular ball bearings 48 coupling the movable output ring gear 50 to the fixed ring gears 40,44. Since the fixed ring gears 40,44 are typically supported by aircraft structure, all loads originating at the output ring gear 50 are transmitted through the annular ball bearings 48 to the fixed ring gear 40,44 and to the aircraft structure. Thus, the spindle gears 34 do not experience unbalanced loads; only torque about the axis of the actuator 10.

Despite all of the important features of the Power Hinge that were just discussed, it is lacking one feature which would significantly increase its functionality. Such a feature is commonly known as jam tolerance. The definition of jam tolerance encompasses the ability of an actuator, or an actuator system, to permit continued input shaft drive capabilities in the event of a jam in the actuator, or one or more of the actuators in an actuator system, respectively, resulting from gear teeth breakage or other internal actuator failures. In the context of the aerospace industry, such a jam-tolerant feature would permit continued aircraft control flap movement in the event of a jam in one or more of the actuators in an actuator system. It is obvious why such a feature would be desirable.

Several patents have been directed toward the concept of jam-tolerant actuator designs. Of these patents, the following are of primary interest to the present invention:

In U.S. Pat. No. 4,856,379 to Jafarey, a non-jamming rotary actuator for aircraft control surfaces is disclosed wherein a cam offset extends the length of an input shaft between two side plates. The cam offset comprises an inner cam member having a first offset from the axis of the input shaft and an outer cam member having a second offset from the axis of the input shaft. Each cam member has an axially extending slot formed therein into which a shear member is press or interference fit. The interrelationship of the cam members and the shear member is such that at a maximum input torque the shear member will fail and the fixed and moving ring gears will become disengaged from the compound planetary gear by the rotation of the rotation of the inner cam member and the resulting axial movement of the outer cam member whereby the outer cam member shares the same axis as the input shaft.

In U.S. Pat. No. 5,071,397 to Grimm, a jam-tolerant geared rotary actuator is disclosed wherein ball members are disposed between a center annular ramp member which is fixed to a through shaft and two outer ramp members which are splined to the through shaft. The interrelationship of the ball members and the ramps members is such that when the through shaft experiences an excessive torque, the two outer ramp members are axially displaced against a bias of springs coupled to sun gears through planet gear radial support members integrally formed with the sun gears, thereby disconnecting a torque path within the actuator.

In U.S. Pat. No. 5,120,285 to Grimm, a jam-tolerant geared rotary actuator is disclosed comprising a compound input stage and a compound output stage doubly connected by input/output link members. The doubly connected arrangement is such that a first input is connected to a first output but also connected to a second input which is, in turn, connected to a second output so that there is an open flow path for torque and power between the input stage and the output stage. Thus, if one flow path locks up, there is always an alternative flow path so that the geared rotary actuator provides for a double flow path.

In U.S. Pat. No. 4,742,730 to Dorn et al., a failsafe rotary actuator is disclosed comprising an input shaft rotatable within an actuator housing, and first and second sun gears secured in a spaced relationship along and with the input shaft for rotation therewith. The failsafe rotary actuator further comprises planetary gears disposed for orbital rotation with and circulation about the sun gears, first and second fixed ring gears disposed for independent rotation with the planetary gears, and first and second output gears disposed for independent driving contact with the planetary gears, wherein a first load path is established between the first sun gear and the first output gear across the planetary gears in cooperative engagement with the first fixed ring gear and a second load path is established between the second sun gear and the second output gear across the planetary gears in cooperative engagement with the second fixed ring gear such that a failsafe stiff link is achieved in the event of a single mechanical failure whereby the position of a control surface connected to the output gears is maintained.

In U.S. Pat. No. 4,282,776 to Eller, overload protection for a transmission system with a planetary gear train is disclosed wherein a control member coupled to a ring gear in the planetary gear train actuates a plurality of switches so as to generate an alarm signal or initiate corrective action.

Although all of the above-discussed patents are directed toward the concept of jam tolerance in actuators and the like, none are directed toward a jam-tolerant rotary actuator incorporating shear lugs formed on an inner input sun gear member and on an inner movable output ring gear member which correspond to recesses formed in an outer input sun gear member and in an outer movable output ring gear member, respectively, where, upon application of a maximum torque to either the inner input sun gear member or the outer movable output ring gear member, the shear lugs will shear thereby allowing the inner input sun gear member to be movable independent of the outer input sun gear member or the outer movable output ring gear member to be movable independent of the inner movable output ring gear member, respectively. The present invention is directed toward such a jam-tolerant actuator.

SUMMARY OF THE INVENTION

The present invention contemplates a rotary actuator that is jam-tolerant by the incorporation of shear lugs formed on an inner input sun gear member and on an inner movable output ring gear member which correspond to recesses formed in an outer input sun gear member and in an outer movable output ring gear member, respectively, where, upon application of a maximum torque to either the inner input sun gear member or the outer movable output ring gear member, the shear lugs will shear thereby allowing the inner input sun gear member to be movable independent of the outer input sun gear member or the outer movable output ring gear member to be movable independent of the inner movable output ring gear member, respectively. As applied to the first actuator embodiment 10 illustrated in FIG. 1, the present invention jam-tolerant rotary actuator concept is implemented by modifying the input sun gear 32 to have an inner and outer members and by modifying the movable output ring gear 50 to have an inner and outer members. The first actuator embodiment 10 may also be modified by adding one or more sensors so as to detect the shearing of the shear lugs on either the inner input sun gear member or the inner movable output ring gear member. It should be noted that, alternatively, the shear lugs may be formed on the outer members and the recesses may be formed in the inner members, respectively. It should also be noted that, alternatively, the shear lugs and the recesses may be formed only on and in the input sun gear members, respectively, or the shear lugs and the recesses may be formed only on and in the movable output ring gear members, respectively.

The modification of the first actuator embodiment 10 as described above creates a jam-tolerant rotary actuator, by definition, by permitting continued input shaft drive capabilities in the event of a jam in the actuator resulting from gear teeth breakage or other internal actuator failures. The present invention concept may also be incorporated in other types of actuators, or in multiple actuators so as to create a jam-tolerant actuator system.

From the above descriptive summary it is apparent how the present invention jam-tolerant rotary actuator concept is distinguishable from the above-mentioned prior art.

Accordingly, the primary objective of the present invention is to provide a jam-tolerant rotary actuator that permits continued input shaft drive capabilities in the event of a jam in the actuator resulting from gear teeth breakage or other internal actuator failures by the incorporation of shear lugs formed on an inner input sun gear member and on an inner movable output ring gear member which correspond to recesses formed in an outer input sun gear member and in an outer movable output ring gear member, respectively.

Other objectives and advantages of the present invention will become apparent to those skilled in the art upon reading the following detailed description and claims, in conjunction with the accompanying drawings which are appended hereto.

BRIEF DESCRIPTION OF THE DRAWINGS

In order to facilitate a fuller understanding of the present invention, reference is now be made to the appended drawings. The drawings should not be construed as limiting the present invention, but are intended to be exemplary only.

PREFERRED EMBODIMENT OF THE PRESENT INVENTION

Figure 1:
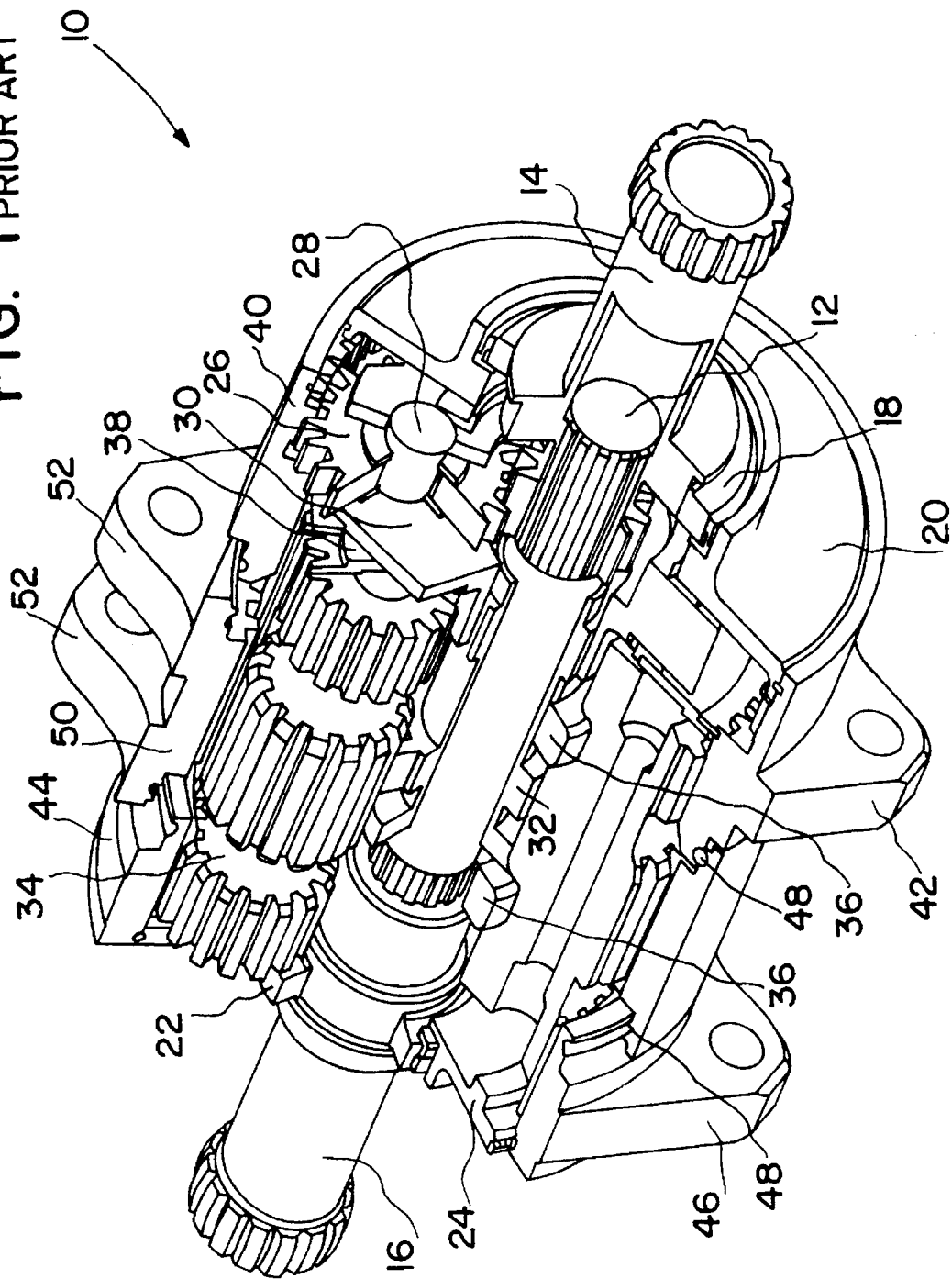
FIG. 1 is a partial cutaway perspective view of a first actuator embodiment utilizing the concepts of the Curtiss-Wright Power Hinge®, said first actuator embodiment comprising a one-stage input planetary gearset and a single slice actuator.

Referring again to FIG. 1, the first actuator embodiment 10 utilizing the concepts of the Curtiss-Wright Power Hinge® is shown comprising the one-stage input planetary gearset and the single slice actuator. Referring to FIG. 2, a second actuator embodiment 60 utilizing the concepts of the Curtiss-Wright Power Hinge® is shown comprising the one-stage input planetary gearset shown in FIG. 1 and a three slice actuator. The basic components of this second actuator embodiment 60 include all of the components shown in FIG. 1, along with a few additional components including splined couplings 62, third fixed ring gears 64 with integrated attachment lugs 66, and inter-slice seals 68. Referring to FIG. 3, a partial cutaway side view of the second actuator embodiment 60 illustrated in FIG. 2 is shown.

Figure 3:
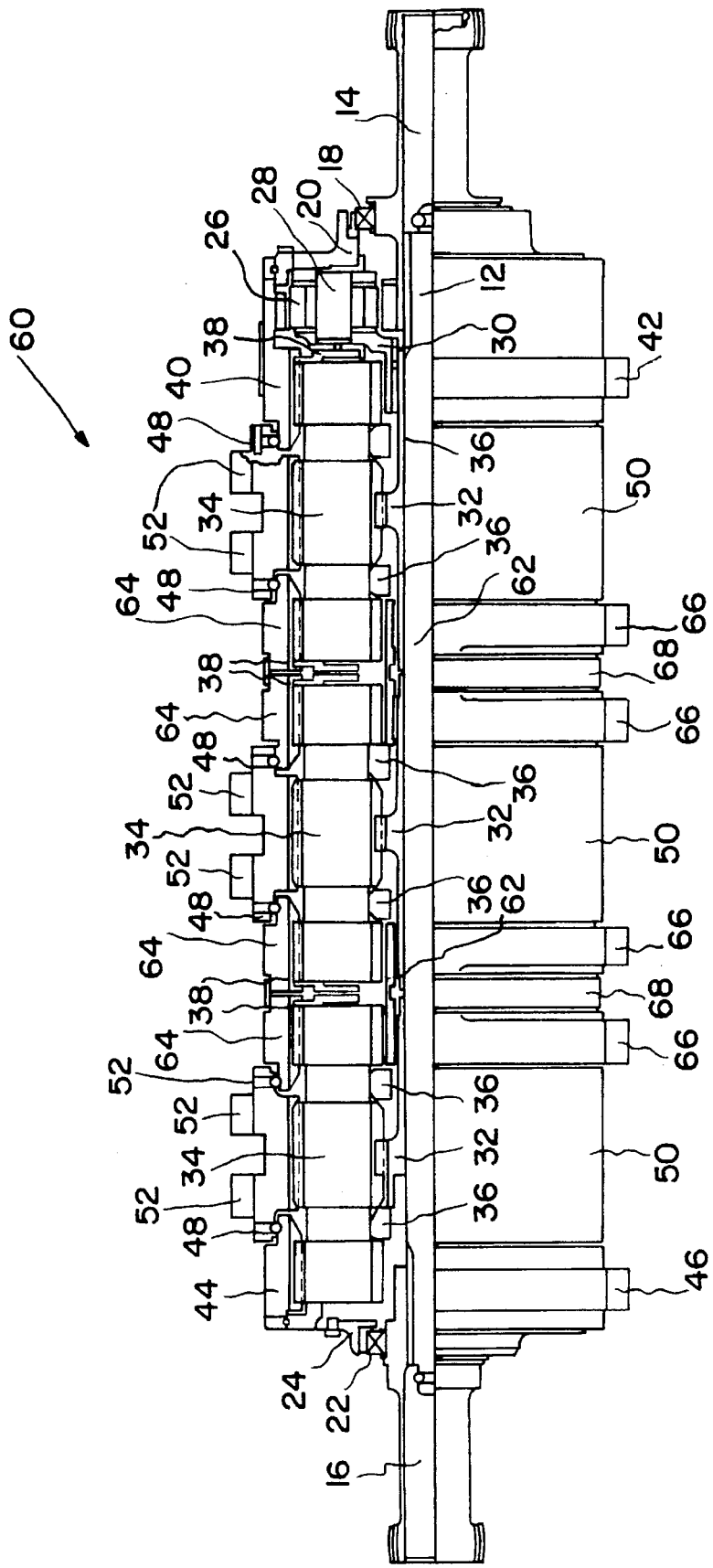
FIG. 3 is a partial cutaway side view of the second actuator embodiment shown in FIG. 2.
Figure 4:
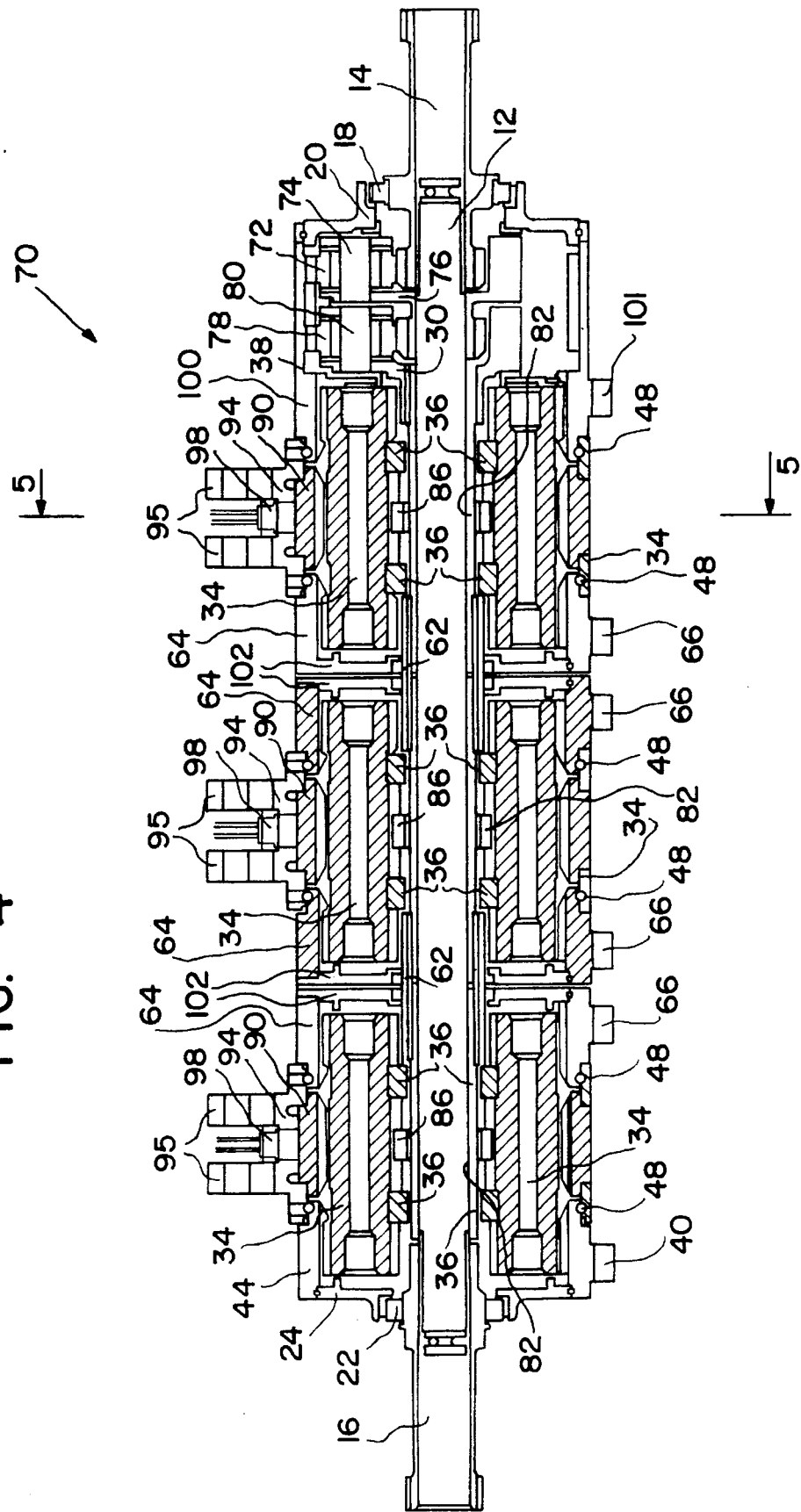
FIG. 4 is a cross-sectional view of a third actuator embodiment utilizing the concepts of the Curtiss-Wright Power Hinge® and incorporating the concepts of the present invention.

Referring to FIG. 4, a third actuator embodiment 70 is shown utilizing the concepts of the Curtiss-Wright Power Hinge® and incorporating the concepts of the present invention. This third actuator embodiment 70 is shown comprising a two-stage input planetary gearset and a three slice actuator. The basic components of this third actuator embodiment 70 include many of the components shown in FIGS. 1–3, along with a few additional components including a first plurality of input planetary gears 72 with a corresponding first plurality of input planetary gear shafts 74, an input planetary gear coupling 76, a second plurality of input planetary gears 78 with a corresponding second plurality of input planetary gear shafts 80, and, according to the present invention, inner input sun gear members 82 having shear lugs 84 formed thereon (see FIG. 5), outer input sun gear members 86 having recesses 88 formed therein (see FIG. 5), inner movable output ring gear members 90 having shear lugs 92 formed thereon (see FIG. 5), and outer movable output ring gear members 94 having recesses 96 formed therein (see FIG. 5). The outer movable output ring gear members 94 have integrated attachment lugs 95. It should be noted that, alternatively, the shear lugs 84,92 may be formed on the outer members 86,94 and the recesses 88,96 may be formed in the inner members 82,90, respectively. It should also be noted that, alternatively, the shear lugs 84 and the recesses 88 may be formed only on and in the input sun gear members 82,86, respectively, or the shear lugs 92 and the recesses 96 may be formed only on and in the movable output ring gear members 90,94, respectively.

A sensor 98 is also provided for each actuator slice so as to detect the shearing of the shear lugs 92 on the inner movable output ring gear members 90. It should be noted that an additional sensor may also be provided for each actuator slice so as to detect the shearing of the shear lugs 84 on the inner input sun gear members 82.

Figure 2:
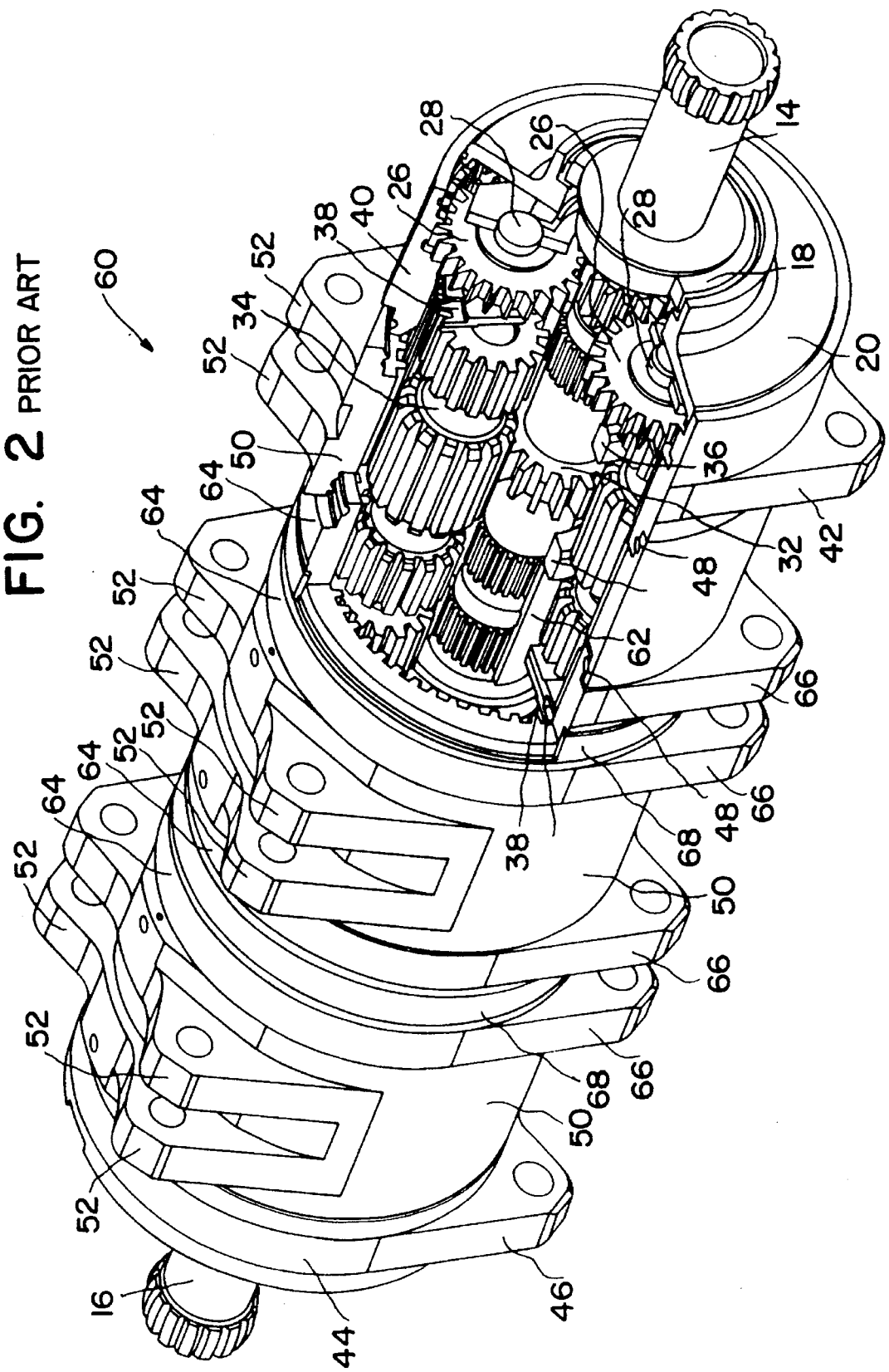
FIG. 2 is a partial cutaway perspective view of a second actuator embodiment utilizing the concepts of the Curtiss-Wright Power Hinge®, said second actuator embodiment comprising the one-stage input planetary gearset shown in FIG. 1 and a three slice actuator.

At this point it should be noted that the first fixed ring gear 40 with integrated attachment lug 42 as shown in the first 10 and second 60 actuator embodiments of FIGS. 1–3 is replaced in the third actuator embodiment 70 of FIG. 4 by a fourth fixed ring gear 100 with integrated attachment lug 101 so as to accommodate the two-stage input planetary gearset. It should also be noted that several of the stiffeners 38 shown in the second actuator embodiment 60 of FIGS. 2 and 3 are replaced in the third actuator embodiment 70 of FIG. 4 by isolation discs 102 so as to prevent the transfer of debris to and from adjacent actuator slices.

Some typical characteristics of an actuator such the third actuator embodiment 70 just described is that it encompasses a 3.77 inch diameter. Furthermore, the input planetary gearset provides a 18.73:1 gear reduction ratio and each actuator slice provides a 68:1 gear reduction ratio, resulting in an overall actuator gear reduction ratio of 1274:1.

Figure 5:
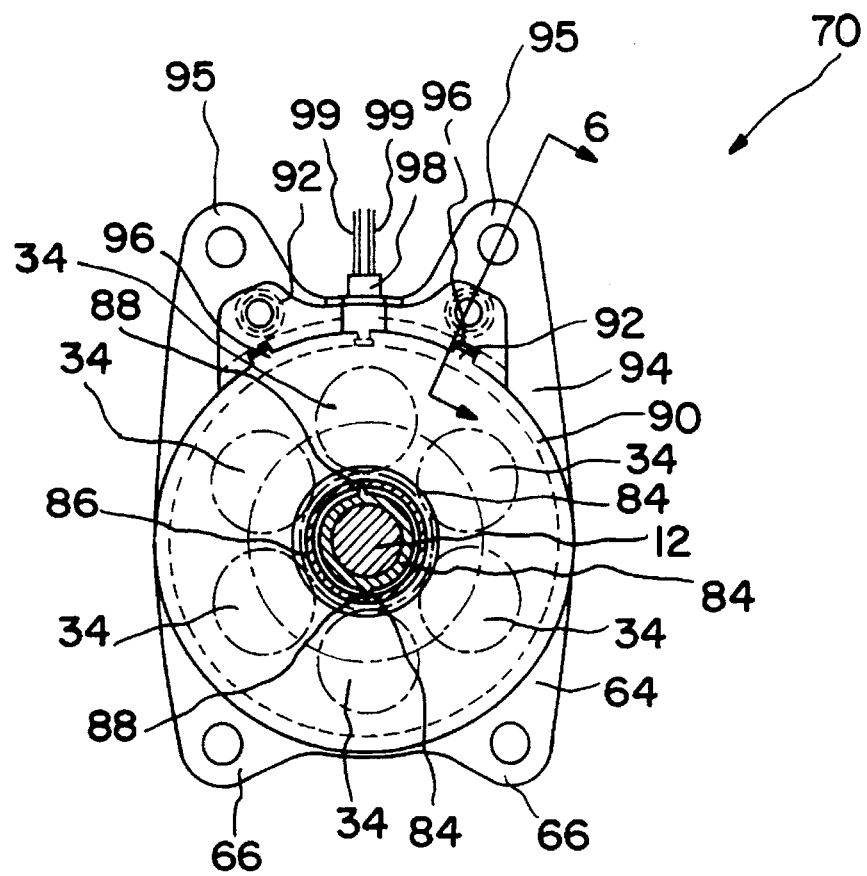
FIG. 5 is a cross-sectional view at line 5—5 of FIG. 4 of the third actuator embodiment shown in FIG. 4.

Referring to FIG. 5, a cross-sectional view of the third actuator embodiment 70 is shown detailing an inner input sun gear member 82, an outer input sun gear member 86, an inner movable output ring gear member 90, and an outer movable output ring gear member 94. The shear lugs 84 formed on the inner input sun gear member 82 correspond to the recesses 88 formed in the outer input sun gear member 86. Similarly, the shear lugs 92 formed on the inner movable output ring gear member 90 correspond to the recesses 96 formed in the outer movable output ring gear member 94. Thus, if upon application of a torque to the inner input sun gear member 82 a maximum torque is realized between the inner input sun gear member 82 and the outer input sun gear member 86, or, more accurately, between the shear lugs 84 formed on the inner input sun gear member 82 and the recesses 88 formed in the outer input sun gear member 86, respectively, the shear lugs 84 will shear thereby allowing the inner input sun gear member 82 to be movable independent of the outer input sun gear member 86. Similarly, if upon application of a torque to the outer movable output ring gear member 94 a maximum torque is realized between the outer movable output ring gear member 94 and the inner movable output ring gear member 90, or, more accurately, between the recesses 96 formed in the outer movable output ring gear member 94 and the shear lugs 92 formed on the inner movable output ring gear member 90, respectively, the shear lugs 92 will shear thereby allowing the outer movable output ring gear member 94 to be movable independent of the inner movable output ring gear member 90.

The practical benefit associated with present invention jam-tolerant rotary actuator design just described is that after the lugs 84,92 shear, a component attached to the integrated attachment lugs 95, such as a aircraft control flap panel, will continue to be supported by the outer movable output ring gear member 94 through the ball bearings 48 and therefore may be driven by any of the remaining undamaged actuator slices since the outer movable output ring gear member 94 is unrestricted and is movable independent of the inner movable output ring gear member 90, and hence its associated damaged actuator slice.

It should be noted that the maximum torque is determined according to the particular application. The maximum torque is a function of the size of the shear lugs 84,92 and the size of the shear lugs 84,92 is determined according to the type of material(s) used.

The sensor 98 detects the shearing of the shear lugs 92 on the inner movable output ring gear member 90 by detecting any relative movement between the inner movable output ring gear member 90 and the outer movable output ring gear member 94. The sensor 98 is comprised of a switch assembly whose body is mounted within the outer movable output ring gear member 94 and switch element is in contact with the inner movable output ring gear member 90. The switch assembly 98 provides a pair of wire leads 99 which provide an indication of an actuator slice failure to a remote location, such as to a cockpit of an aircraft. As previously stated, an additional sensor may be provided so as to detect the shearing of the shear lugs 84 on the inner input sun gear member 82.

Figure 6:
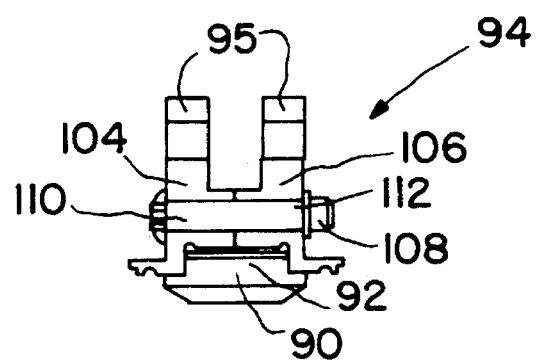
FIG. 6 is a partial cross-sectional view of the third actuator embodiment shown in FIG. 5, taken along line 6—6 of FIG. 5.

Referring to FIG. 6, it can be readily seen that the outer movable output ring gear member 94 is actually of two piece construction having a first outer movable output ring gear member 104 and a second outer movable output ring gear member 106. The first outer movable output ring gear member 104 is secured to the second outer movable output ring gear member 106 by a nut 108, bolt 110, and washer 112 combination. Such a construction is adopted so as to allow the sensor 98 to be cooperatively mounted between the first outer movable output ring gear member 104 and the second outer movable output ring gear member 106.

It should be noted that the fixed input ring gear members 40, 44, 64, 100 may be used as movable output ring gear members, and the movable output ring gear members 50, 90, 94 may be used as fixed input ring gear members. Such use would cause the gear ratio to change by 1.

It should also be noted that the present invention allows a large variety of possible gear ratios, and thus the present invention is not limited to the gear ratios described herein. Similarly, the present invention is not limited by the actuator diameter described herein.

With the present invention actuator design 70 now fully described, it can thus be seen that the primary objective set forth above is efficiently attained and, since certain changes may be made in the above-described actuator design 70 without departing from the scope of the invention, it is intended that all matter contained in the above description or shown in the accompanying drawings shall be interpreted as illustrative and not in a limiting sense.

What is claimed is:

1. A jam-tolerant rotary actuator comprising:

an inner cylindrical sun gear member having at least one shear lug formed thereon;

an outer cylindrical sun gear member surrounding said inner sun gear member, said outer sun gear member having at least one recess formed therein corresponding to said at least one inner sun gear member shear lug for accepting the same, said outer sun gear member having external gear teeth formed therein;

a plurality of cylindrical spindle gears arranged around said outer sun gear member, each of said plurality of spindle gears having external gear teeth formed therein, said external gear teeth of said plurality of spindle gears meshing with said external gear teeth of said outer sun gear member;

an inner cylindrical movable ring gear member surrounding said plurality of spindle gears, said inner movable ring gear member having at least one shear lug formed thereon, said inner movable ring gear member having internal gear teeth formed therein, said internal gear teeth of said inner movable ring gear member meshing with said external gear teeth of said plurality of spindle gears;

an outer cylindrical movable ring gear member surrounding said inner movable ring gear member, said outer movable ring gear member having at least one recess formed therein corresponding to said at least one inner movable ring gear member shear lug for accepting the same; and at least one cylindrical fixed ring gear surrounding said plurality of spindle gears, each said fixed ring gear having internal gear teeth formed therein, said internal gear teeth of each said fixed ring gear meshing with said external gear teeth of said plurality of spindle gears.

2. The jam-tolerant rotary actuator as defined in claim 1, further comprising sensor means so as to detect the shearing of said shear lugs on said inner movable ring gear member.

3. The jam-tolerant rotary actuator as defined in claim 2, wherein said sensor means is mounted within said outer movable ring gear member.

4. The jam-tolerant rotary actuator as defined in claim 1, further comprising sensor means so as to detect the shearing of said shear lugs on said inner sun gear member.

5. The jam-tolerant rotary actuator as defined in claim 1, wherein said outer movable ring gear member provides attachment means for attachment to a movable element.

6. The jam-tolerant rotary actuator as defined in claim 1, wherein each said fixed ring gear member provides attachment means for attachment to a stationary element.

7. The jam-tolerant rotary actuator as defined in claim 1, wherein said outer movable ring gear member is of two piece construction having a first outer movable ring gear member and a second outer movable ring gear member secured together by securing means.

8. The jam-tolerant rotary actuator as defined in claim 7, further comprising sensor means so as to detect the shearing of said shear lugs on said inner movable ring gear member.

9. The jam-tolerant rotary actuator as defined in claim 8, wherein said sensor means is cooperatively mounted between said first outer movable ring gear member and said second outer movable ring gear member.

10. A jam-tolerant rotary actuator comprising:

an inner cylindrical sun gear member having at least one shear lug formed thereon;

an outer cylindrical sun gear member surrounding said inner sun gear member, said outer sun gear member having at least one recess formed therein corresponding to said at least one inner sun gear member shear lug for accepting the same, said outer sun gear member having external gear teeth formed therein;

a plurality of cylindrical spindle gears arranged around said outer sun gear member, each of said plurality of spindle gears having external gear teeth formed therein, said external gear teeth of said plurality of spindle gears meshing with said external gear teeth of said outer sun gear member;

a cylindrical movable ring gear surrounding said plurality of spindle gears, said movable ring gear having internal gear teeth formed therein, said internal gear teeth of said movable ring gear meshing with said external gear teeth of said plurality of spindle gears; and at least one cylindrical fixed ring gear surrounding said plurality of spindle gears, each said fixed ring gear having internal gear teeth formed therein, said internal gear teeth of each said fixed ring gear meshing with said external gear teeth of said plurality of spindle gears.

11. The jam-tolerant rotary actuator as defined in claim 10, further comprising sensor means so as to detect the shearing of said shear lugs on said inner sun gear member.

12. The jam-tolerant rotary actuator as defined in claim 10, wherein said movable ring gear member provides attachment means for attachment to a movable element.

13. The jam-tolerant rotary actuator as defined in claim 10, wherein each said fixed ring gear member provides attachment means for attachment to a stationary element.

14. A jam-tolerant rotary actuator comprising:

a cylindrical sun gear having external gear teeth formed therein;

a plurality of cylindrical spindle gears arranged around said sun gear, each of said plurality of spindle gears having external gear teeth formed therein, said external gear teeth of said plurality of spindle gears meshing with said external gear teeth of said sun gear;

an inner cylindrical movable ring gear member surrounding said plurality of spindle gears, said inner movable ring gear member having at least one shear lug formed thereon, said inner movable ring gear member having internal gear teeth formed therein, said internal gear teeth of said inner movable ring gear member meshing with said external gear teeth of said plurality of spindle gears;

an outer cylindrical movable ring gear member surrounding said inner movable ring gear member, said outer movable ring gear member having at least one recess formed therein corresponding to said at least one inner movable ring gear member shear lug for accepting the same; and at least one cylindrical fixed ring gear surrounding said plurality of spindle gears, each said fixed ring gear having internal gear teeth formed therein, said internal gear teeth of each said fixed ring gear meshing with said external gear teeth of said plurality of spindle gears.

15. The jam-tolerant rotary actuator as defined in claim 14, further comprising sensor means so as to detect the shearing of said shear lugs on said inner movable ring gear member.

16. The jam-tolerant rotary actuator as defined in claim 15, wherein said sensor means is mounted within said outer movable ring gear member.

17. The jam-tolerant rotary actuator as defined in claim 14, wherein said outer movable ring gear member provides attachment means for attachment to a movable element.

18. The jam-tolerant rotary actuator as defined in claim 14, wherein each said fixed ring gear member provides attachment means for attachment to a stationary element.

19. The jam-tolerant rotary actuator as defined in claim 14, wherein said outer movable ring gear member is of two piece construction having a first outer movable ring gear member and a second outer movable ring gear member secured together by securing means.

20. The jam-tolerant rotary actuator as defined in claim 19, further comprising sensor means so as to detect the shearing of said shear lugs on said inner movable ring gear member.

21. The jam-tolerant rotary actuator as defined in claim 20, wherein said sensor means is cooperatively mounted between said first outer movable ring gear member and said second outer movable ring gear member.

* * * * *